(12) United States Patent
Jacobsson et al.

(10) Patent No.: US 9,964,837 B2
(45) Date of Patent: May 8, 2018

(54) MOUNTING ARRANGEMENT FOR MOUNTING A DEVICE, AND METHODS FOR MOUNTING THE MOUNTING ARRANGEMENT

(71) Applicant: Axis AB, Lund (SE)

(72) Inventors: Caroline Jacobsson, Lund (SE); Linnéa Karlsson, Västra Amtervik (SE)

(73) Assignee: Axis AB, Lund (SE)

( * ) Notice: Subject to any disclaimer, the term of this patent is extended or adjusted under 35 U.S.C. 154(b) by 0 days. days.

(21) Appl. No.: 15/171,102

(22) Filed: Jun. 2, 2016

(65) Prior Publication Data

US 2016/0357091 A1   Dec. 8, 2016

(30) Foreign Application Priority Data

Jun. 3, 2015   (EP) ..................................... 15170366

(51) Int. Cl.
  *F21V 21/04*   (2006.01)
  *G03B 17/56*   (2006.01)
  (Continued)

(52) U.S. Cl.
  CPC ......... *G03B 17/561* (2013.01); *F16M 13/027* (2013.01); *F21S 8/02* (2013.01);
  (Continued)

(58) Field of Classification Search
  USPC ........ 248/342, 343, 344, 318, 906; 362/364, 362/365, 366, 368, 374; 220/3.2, 3.3,
  (Continued)

(56) References Cited

U.S. PATENT DOCUMENTS

| 1,453,233 | A | * | 4/1923 | Ball, Jr. | .................. | F21V 21/02 |
|   |   |   |   |   |   | 248/343 |
| 1,564,609 | A | * | 12/1925 | Morgenstern | ........... | F21V 21/02 |
|   |   |   |   |   |   | 248/343 |

(Continued)

FOREIGN PATENT DOCUMENTS

| EP | 2 637 486 A | 9/2013 |
| EP | 2 637 486 A1 | 9/2013 |

(Continued)

OTHER PUBLICATIONS

EP 15 17 0366.7 European Search Report (dated Dec. 10, 2015).
KR 10-2016-0066656 Office Action dated Jan. 4, 2018.
JP 2016-103869 Office Action dated Jan. 16, 2018.

*Primary Examiner* — Alfred Wujciak
(74) *Attorney, Agent, or Firm* — Volpe and Koenig, P.C.

(57) ABSTRACT

A mounting arrangement for mounting a device in an opening in a structure comprising a socket configured to receive the device, an anchoring element, and a fastening element configured for adjustable engagement with the anchoring element is disclosed. The socket has a plate portion and a body portion to be insertable in the opening, and an abutment flange extending from the body portion and dimensioned to abut a first side of the structure, and an aperture for receiving the fastening element. The anchoring element is insertable through the opening and has abutment portions for abutting a second side of the structure, the anchoring element comprising an opening for receiving and holding the fastening element. The fastening element has a distal end configured to adjustably engage with the opening of the anchoring element, and a proximal end configured to engage with the aperture of the socket and to hold the socket.

12 Claims, 3 Drawing Sheets

(51) Int. Cl.
   *F16M 13/02* (2006.01)
   *F21S 8/02* (2006.01)
   *G08B 13/196* (2006.01)
   *H04R 1/02* (2006.01)

(52) U.S. Cl.
   CPC ...... *F21V 21/042* (2013.01); *G08B 13/19632* (2013.01); *H04R 1/026* (2013.01); *F21V 21/043* (2013.01)

(58) Field of Classification Search
   USPC .............. 220/3.5, 3.6, 3.7, 3.8, 3.9; 206/806
   See application file for complete search history.

(56) References Cited

U.S. PATENT DOCUMENTS

| | | | | |
|---|---|---|---|---|
| 1,703,649 | A * | 2/1929 | Weinstein | F21V 21/02 248/343 |
| 1,779,681 | A * | 10/1930 | Smith | H02G 3/123 180/90 |
| 2,559,241 | A * | 7/1951 | Bernstein | F21V 21/04 248/343 |
| 4,390,105 | A * | 6/1983 | Graves | H02B 1/044 220/3.6 |
| 7,586,039 | B1 * | 9/2009 | Gretz | H02G 3/123 174/481 |
| 8,193,446 | B1 * | 6/2012 | Taylor | H02G 3/123 174/50 |
| 2008/0230668 | A1 * | 9/2008 | Johnson | H02G 3/20 248/343 |
| 2011/0235342 | A1 | 9/2011 | Liang | |

FOREIGN PATENT DOCUMENTS

| | | |
|---|---|---|
| JP | 092781/1973 U | 11/1973 |
| JP | H11-189104 A2 | 7/1997 |
| JP | 2004-120192 A | 4/2004 |
| JP | 2006-013736 A | 1/2006 |
| JP | 2010-177857 A | 8/2010 |
| JP | 2012 129016 A2 | 7/2012 |
| WO | 2012 067166 A1 | 5/2012 |

* cited by examiner

MOUNTING ARRANGEMENT FOR MOUNTING A DEVICE, AND METHODS FOR MOUNTING THE MOUNTING ARRANGEMENT

FIELD OF INVENTION

A mounting arrangement for mounting a device in an opening in a structure is disclosed.

BACKGROUND

There are many situations in which it is desirable to mount a device in an opening in a structure. For instance, spotlights, loudspeakers, or monitoring cameras may be mounted recessed in a ceiling or a wall. For many such mountings, a dedicated arrangement is used for simplifying the mounting procedure. Some mounting arrangements are generally made up of a cup having fixing legs arranged on screws extending through the cup. Before the cup is inserted in an opening in which it is to be mounted, the fixing legs are rotated inwardly, towards the cup. Once the cup has been inserted in the opening, the fixing legs are rotated outwardly from the cup by operating the screws. By continued operation of the screws, the fixing legs will move along the screws for adaptation to the thickness of the wall or ceiling. Such a mounting arrangement may securely hold a device mounted in the opening, but it may be difficult to operate the screws while simultaneously holding the arrangement in place.

An example of a mounting arrangement that may be easier to install may be seen in EP 2 045 512, which discloses a holder generally in the form of a cup. At an outer end, the cup has a flange arranged to abut against an outer surface of, e.g., a ceiling. At an inner end, the cup has openings through which spring-biased supporting legs extend outwardly. For inserting the holder in an opening, the supporting legs may be pivoted towards each other and held such that they extend in a longitudinal direction of the cup. Once the cup has been inserted in the opening, the supporting legs may be released and are by spring force pivoted out and down towards an inner surface of the ceiling. In this manner, the holder is retained in the opening. Such a mounting arrangement simplifies recessed mounting, but in some situations, it would be beneficial to have a mounting arrangement that may be manufactured at a lower cost.

SUMMARY

One object of the disclosure is to provide a mounting arrangement that may enable easy mounting of a device in an opening in a structure.

Another object is to provide a mounting arrangement that may be manufactured at a low cost.

It is a further object of the disclosure to provide a method of mounting a device in an opening in a structure which is easy to perform.

These and other objects are fully or partially accomplished by an inventive mounting arrangement, namely:

A mounting arrangement for mounting a device in an opening in a structure. The mounting arrangement comprises a socket configured to receive the device, an anchoring element, and a fastening element configured for adjustable engagement with the anchoring element. The socket has a plate portion and a body portion dimensioned to be insertable in the opening, an abutment flange extending from the body portion and dimensioned to abut a first side of the structure, and an aperture for receiving the fastening element. The anchoring element is dimensioned to be insertable through the opening and has abutment portions for abutting a second side of the structure. The anchoring element further comprising an opening for receiving and holding the fastening element. Turning to the fastening element it has a distal end (118) configured to adjustably engage with the opening of the anchoring element, and a proximal end configured to engage with the aperture of the socket and to hold the socket. Adjustment of the fastening element in the opening of the anchoring element adjusts a distance between the fastening element and the socket, so as to adjust to a thickness of the structure.

In one or several embodiments the anchoring element may have a U-shape with legs interconnected by a bridging portion, and wherein abutment portions are arranged on the free ends of the legs. The U-shape may facilitate a rigid structure while still allowing for the socket to be mounted in a recessed manner in situations where a thickness of the structure is limited.

The number of legs of the anchoring element may be two or more, such as three, four or five. A higher number of legs may also be possible, though not preferred.

In one or more embodiments the opening of the anchoring element has an interior thread to allow for a threaded engagement with the fastening element.

The fastening element may comprise a stem extending from a head portion, the stem having an exterior thread for cooperation with the anchoring element.

The stem may have a recess reducing an effective diameter thereof, and the recess may be configured to reduce the effective diameter to be smaller than the width of an inlet leading to the aperture of the socket.

The aperture of the socket may in one or more embodiments be open at one lateral side by means of the inlet, which facilitates the application of the socket onto the fastening element. The inlet may have a width smaller than a diameter of the aperture.

In one or several embodiments the inlet may be provided with a one-way mechanism to simplify mounting even further and to facilitate positioning of the fastening element in the aperture.

The aperture may in one or several embodiments be partly surrounded by an axially extending lip for positioning of the fastening element.

According to a second aspect the present disclosure relates to a method for mounting a mounting arrangement according to any preceding claim in an opening in a structure, the mounting arrangement comprising a socket, an anchoring element, and a fastening element. The method comprises: attaching a distal end of the fastening element to the anchoring element, arranging the anchoring element on a first side of the structure, attaching the socket to a distal end of the fastening element on a second side of the structure, opposite to said first side, and actuating the fastening element such as to reduce an axial distance between the anchoring element and the socket until portions of the anchoring element abut the first side of the structure and portions of the socket abut the second side of the structure while other portions of the socket are inserted in the opening.

Such method may also comprise mounting a camera to the socket.

BRIEF DESCRIPTION OF THE DRAWINGS

A more detailed understanding may be had from the following description, given by way of example in conjunction with the accompanying drawings wherein.

DETAILED DESCRIPTION

The present disclosure, according to one embodiment thereof, will now be described with reference to the drawings. First, to put the embodiment in context, a mounting sequence will be illustrated referring to FIGS. 1-3. Details of individual components will then be described referring to FIGS. 4-7.

Figure 1:
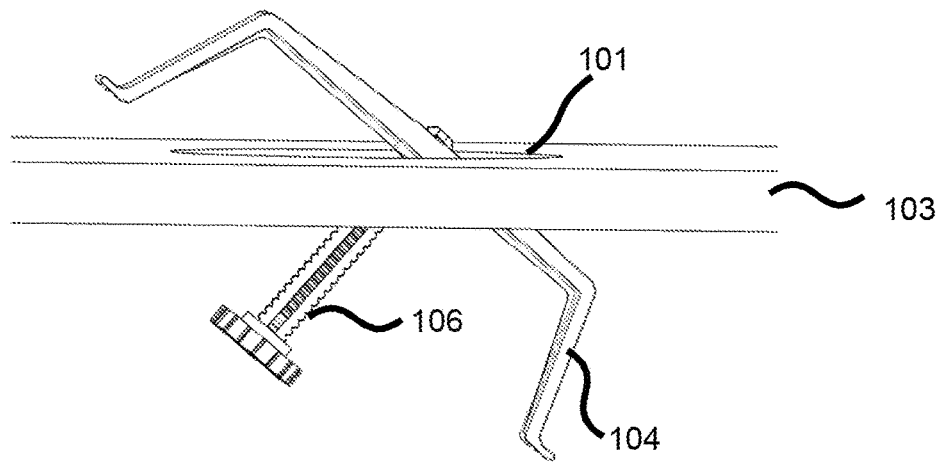
FIGS. 1-3 are perspective views illustrating a sequence of mounting a mounting arrangement according to one embodiment.

A mounting arrangement is in the first embodiment formed from three main components: A socket 102, an anchoring element 104 and a fastening element 106. Referring to FIG. 1 the mounting arrangement is designed for mounting in an opening 101 of a structure 103 or partition. In FIG. 1 this is illustrated as a ceiling. In a first step (not shown) the fastening element 106 is attached to the anchoring element 104, creating an anchor-like assembly as shown in FIG. 1. The anchoring element 104 is designed to extend over the diameter of the opening 101 so the assembly 104/106 is tilted for the anchoring element 104 to be inserted through the opening. In this way the anchoring element 104 will be arranged on one side of the structure 103, while at least one end of the fastening element 106 will be accessible from the other side of the structure 103.

Figure 2:
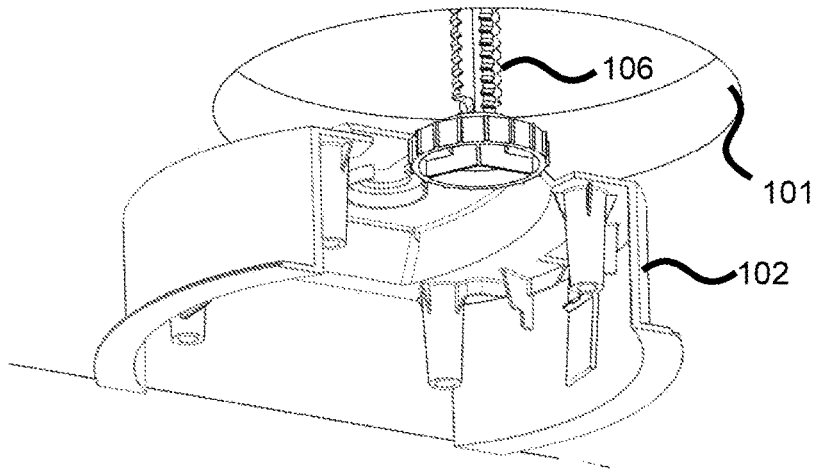
Figure 3:
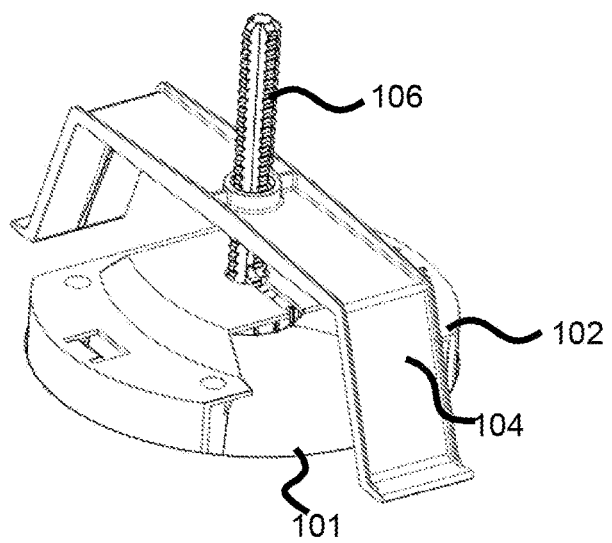

In a second step, as shown in FIG. 2, the socket 102 is arranged on the fastening element 106, at the end remote from the end attached to the anchoring element 104. Following the arrangement of the socket 102 the fastening element 106 is tightened, effectively bringing the socket 102 closer to the anchoring element 104 until the position of FIG. 3 is reached. In this position In the position of FIG. 3 portions of the socket 102 will abut one side of the structure 103, and portions of the anchoring element 104 will abut an opposite side of the structure while the fastening element 106 will pull the socket 102 towards the anchoring element 104, thus positioning the mounting arrangement in the opening of the structure. In FIG. 3 the anchoring element as mounted at a particular angle in relation to the symmetry of the socket. This angle may be preferred for reasons of stability, yet it may be mounted at any angle and still achieve the inventive objects. Details of the components may act to facilitate the mounting and positioning, and these details will be discussed in reference to FIGS. 4-7. In the present disclosure all details are mentioned in relation to a single embodiment, and though the combined use will lead to beneficial effects it would still be possible to use details in isolation so as to form further embodiments.

Figure 4:
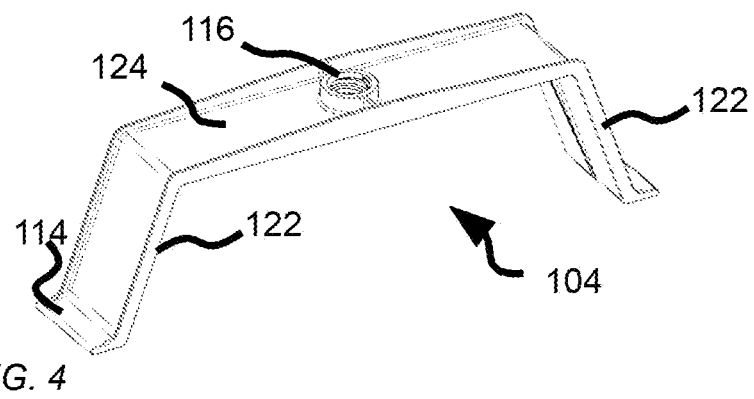
FIG. 4 is perspective view of an anchoring element as used in one embodiment.

FIG. 4 illustrates the anchoring element 104 of the first embodiment. The anchoring element 104 has a generally U-shaped appearance, with leg portions 122 interconnected by a bridging portion 124. At the free end of each leg portion 122 there are abutment portions 114 for abutting the structure 103 (see FIG. 3). The nature of the structure 103 could affect the design of the abutment portions 114, yet in the present embodiment they are designed to provide an enlarged abutment surface between the anchoring element 104 and the structure 103. The U-shaped design is dimensioned so as to allow space for the socket 102 when the mounting arrangement is in an assembled state, i.e. to enable a recessed mount where the socket is essentially flush with the structure. The anchoring element 104 also has an opening 116 for receiving a distal end of the fastening element 106. In the present embodiment the opening 116 has an interior thread to match an exterior thread of the fastening element 106.

The anchoring element may also comprise structural details providing rigidity and stability, as is evident from FIG. 3. The amount and form of such structural details may vary with material, which in the present case is moulded plastics.

Figure 5:
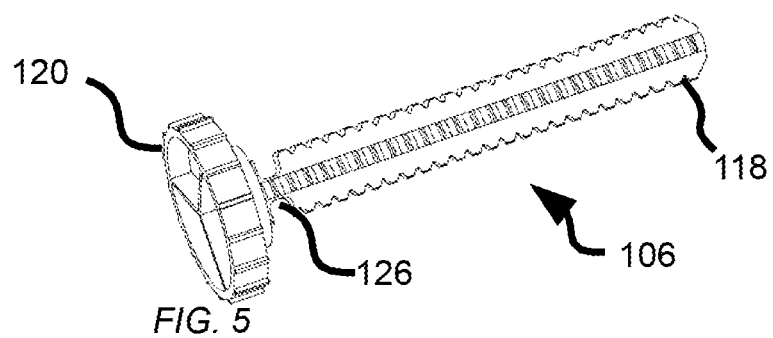
FIG. 5 is a perspective view of a fastening element as used in one embodiment.

FIG. 5 illustrates the fastening element 106 as used in the first embodiment of the present disclosure. This embodiment of the fastening element 106 could for simplicity be referred to as a threaded bold, though some details differ. A distal end 118 of the device is configured for adjustable engagement with the opening 116 of the anchoring element 104, which for the present embodiment equals to having an exterior thread matching the interior thread of the opening 116. A beneficial effect of having a threaded engagement is that it may be tightened without counter-pressure from the anchoring element, which may be inaccessible during the later stages of a mounting sequence.

An actuator is arranged at the proximal end 120 of the fastening element, and the actuator may include both a head dimensioned for manual operation (as shown in FIG. 5) and constructions formed for cooperation with tools (such as hex keys or screwdrivers etc.). In the present embodiment the head of the fastening element also comprises a structure for cooperating with portions of the socket 102, so as to improve relative positioning of the two. In the present embodiment there is also a recess 126 in the threaded stem of the fastening element close to the head at the proximal end 120. The fastening element of the present embodiment may be moulded from plastics, and it may be designed for reduction of material required, decrease of cooling times and simplicity of moulding, which in the present embodiment is realized by the longitudinal recesses extending along the length of the threaded stem. In another embodiment this could be realized by making the stem fully or partly hollow.

From an ease-of-use standpoint it is beneficial if the fastening element 106 has a length such that it may be attached to the anchoring element 104 being arranged at one side of the structure while still being accessible from the remote side of the structure. This simplifies the arrangement of the socket 102 onto the fastening element 106.

Figure 6:
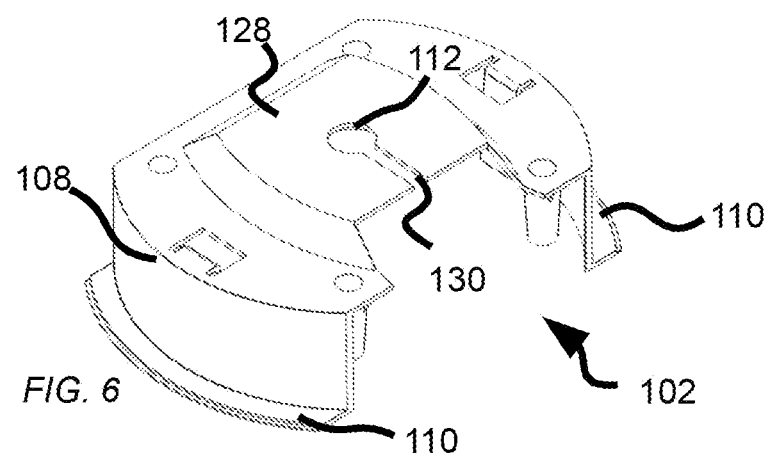
FIG. 6 is a perspective view of the exterior of a socket as used in one embodiment.

FIG. 6 is a first view of the socket 102, and this view shows most of the relevant details. The socket 102 has a body portion 108 extending from a bottom plate 128. Both the bottom plate 128 and the body portion 108 are dimensioned to be insertable in the opening 101 of the structure where it should be arranged. The body portion 108 may be divided into several portions, as is the case for the present embodiment. Such a construction reduces the amount of material needed and facilitates accessibility. The body portion 108 will securely position the socket 102 relative to the opening 101 in the plane of the opening, preventing the socket 102 from shifting position after it has been arranged in the opening. At least a portion of the free end of the bottom portion transitions into abutment flanges 110. The abutment flanges are configured to abut the side of the structure remote to the anchoring element.

The socket 102 has an aperture 112 for receiving the fastening element 106, or at least the stem thereof. It is preferred, though not necessary, that the aperture is open at one lateral side, such that the socket 102 may be slid onto the fastening element 106, since such a configuration simplifies the mounting sequence. In the present embodiment, where the fastening element is provided with a recess (or cutout) 126 the dimensions of a groove 130 providing an opening for the aperture 112 may be reduced as compared to a diameter of the aperture itself. By orienting the socket correctly in relation to the fastening element it may slide onto the fastening element laterally, and then lock into position as it is shifted axially towards the proximal end of the fastening element.

Figure 7:
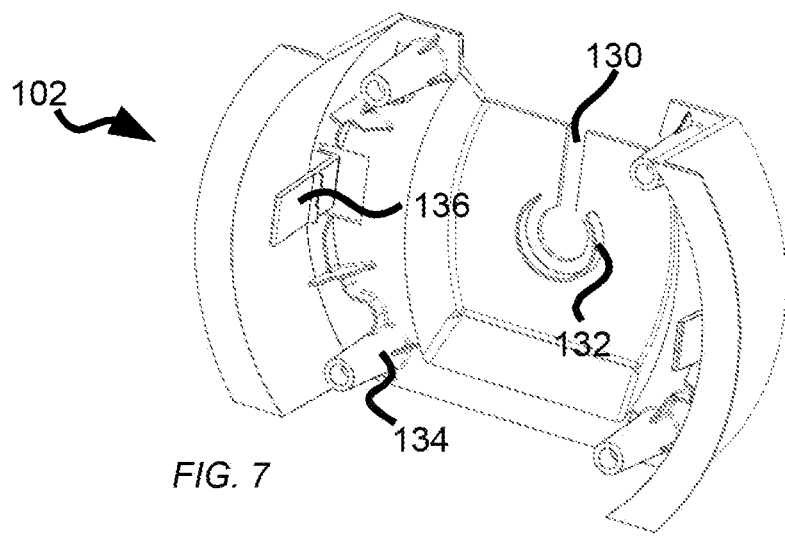
FIG. 7 is a perspective view of the interior of the socket of FIG. 6.

FIG. 7 illustrates the socket of FIG. 6 from its interior side, and many of the features discussed in relation to FIG. 6 are readily identified. Adding to this a positioning lip 132 is shown. In short, the positioning lip is designed to cooperate with the head of the fastening element 106 to improve positioning even further. Also shown are posts 134 and other elements 136 for mounting of a camera or a camera housing (not shown) in the socket.

Figure 8:
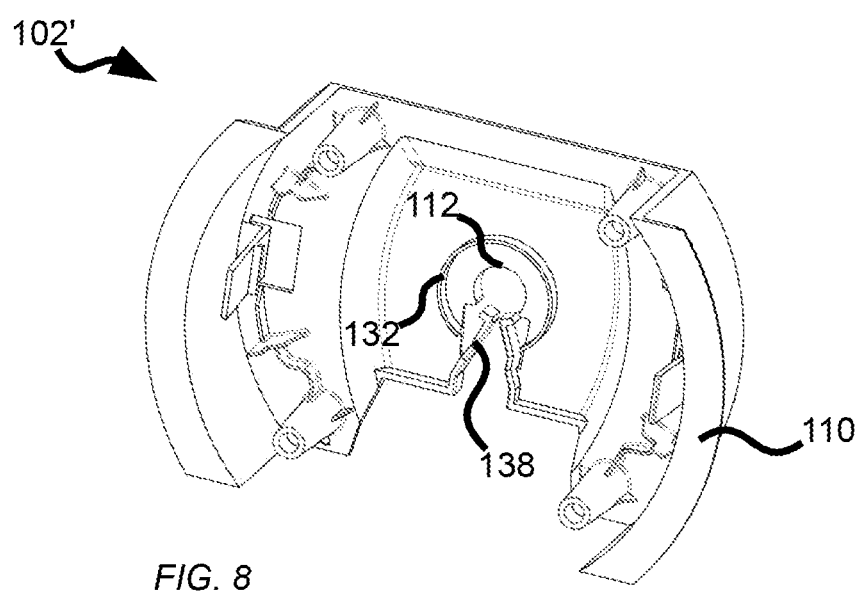
FIG. 8 is a perspective view similar to that of FIG. 7, yet of a second embodiment.

FIG. 8 is a view similar to FIG. 7, yet of a socket 102' of a second embodiment. By comparison the embodiment of FIG. 8 is very similar to the one of FIG. 7, and like details will not be discussed. The main difference relates to the aperture 112. In the second embodiment, an inlet to the aperture is provided with a one-way mechanism 138 in the form of two flexing members 138. Each flexing member is attached (or preferably formed in one piece with) the bottom plate at one end, while the other end is free, extending into the entrance or inlet of the aperture. Their general direction is towards the aperture 112 and as should be evident from the drawing they would allow for a fastening mechanism (such as a threaded rod) to pass laterally into the aperture, while passing the other way will be more difficult. When used in combination with this embodiment the fastening element would not need to be provided with the recess 126.

The socket of any embodiment may be manufactured from moulded plastic.

In another embodiment (not shown) the fastening element is arranged to extend from the anchoring element and interact with the socket with a free end. The interaction may be based on a self-locking action, e.g. similar to a regular cable tie. In such an embodiment the anchoring element may be pulled down towards the socket by means of the fastening element, while the socket is pushed upwards until the socket is arranged securely in place. There may obviously be more than one such fastening element in one and the same arrangement, and the fastening element may engage directly with the socket or with a separate locking element arranged on a remote side of the socket (in relation to the anchoring element). The fastening element may be configured for one time use, i.e. to secure the mounting arrangement once and be cut or broken in a disassembly (and replaced for a consecutive mounting procedure). A similar example of a fastening element but of a more reversible nature could be a ball chain extending from the anchoring element and interacting with an aperture of the socket. Here to, more than one fastening element may be used for a single mounting arrangement. Also, this and other methods of fastening may benefit from flexible and resilient properties of the anchoring element and/or the socket facilitating a tight and secure fit in the opening of the structure. The resilient properties may be due to choice of material, yet they may also be attributed to the construction (design) of the elements, down to using a resilient material for the fastening element.

In the above a limited number of embodiments have been disclosed. This should not be construed as limiting for the present disclosure as defined by the appended claims. For example, the mounting arrangement could be arranged in any partition; a wall, a ceiling, a plate, in a partition of a box, in constructional details of a vehicle, etc. The fastening element disclosed is similar to a threaded bolt, but the function could be provided by other means, such as cooperating pegs and grooves, e.g. a bayonet mount. Furthermore, the arrangement is described as circular, adapted for circular openings, but it may as well be quadratic, rectangular, triangular etc., with or without rounded corners or irregular shapes. The shape will be adapted for the device to be arranged in the socket. In regard of the anchoring element it has been described as having a U-shape with two legs. It could however have a higher number of legs, such as three, four or five, equidistantly arranged around a circumference or not. A higher number of legs could increase stability, and it could make it more complicated to insert the anchoring element through the opening. In theory (and practice for that matter) the anchoring element could comprise two or more portions similar to the one disclosed in the drawing attached to each other in a pivotal manner, such that it may be folded to simplify the insertion through the opening. In most cases, however, this would be an unnecessarily complex and expensive solution from a manufacturing standpoint.

In the present disclosure the word "comprise" has been used in its conventional non-excluding meaning (for patent literature), yet it should be emphasized that although the present mounting arrangement comprises three functional parts and by that may include more parts, a preferred embodiment may consist of three parts only, which offers a simplistic design for a complex application.

The device to be mounted in the mounting arrangement may be a camera. The camera may be a monitoring camera, and may be any type of camera, such as a camera employing visible light, an IR camera, a thermal camera or a TOF camera.

Further, although the example described above refers to the device as being a camera, the device may be any kind of device to be mounted in an opening in a structure, e.g., a spotlight, a loudspeaker or an alarm sensor, such as a PIR sensor.

In regard of the material for the details this may vary for different applications. A moulded plastic component should fulfil most criteria, yet other materials, such as metal or polymer composites would be possible and even preferred for some applications. In terms of plastics some parts could be made of PA+GF (Polyamide with fiberglass) and some of PC+ABS (Polycarbonate and Acrylonitrile butadiene styrene), which are materials commonly used in the field. By adding fiberglass to the plastic material, it becomes more rigid, yet more brittle. For that reason, PA+GF could be used in the parts where stability is important, such as for the anchoring element and for the socket. The fastening element could be made of plastic without fiberglass, as it may be ductile rather than brittle. Notably this is not an exhaustive list, and it should not be construed as one.

Thus, the disclosure should not be limited to the shown embodiments but should only be defined by the appended claims.

What is claimed is:

1. A mounting arrangement for mounting a device in an opening in a structure, said arrangement comprising:
   a socket configured to receive the device;

an anchoring element having a U-shape profile with legs interconnected by a bridging portion; and a fastening element configured for adjustable engagement with the anchoring element;

said socket having a plate portion and a body portion dimensioned to be insertable in the opening, an abutment flange extending from the body portion and dimensioned to abut a first side of the structure, and an aperture for receiving the fastening element;

said anchoring element being dimensioned to be insertable through the opening and having a fixed distance between abutment portions of the anchoring element, wherein the fixed distance is larger than a width of the opening in the structure, wherein the abutment portions are configured to abut a second side of the structure, and wherein the anchoring element further comprises an opening for receiving and holding the fastening element;

said fastening element having a distal end configured to adjustably engage with the opening of the anchoring element, and a proximal end configured to engage with the aperture of the socket and to hold the socket;

wherein adjustment of the fastening element in the opening of the anchoring element adjusts a distance between the fastening element and the socket so as to adjust to a thickness of the structure, wherein the anchoring element maintains a constant profile before and after adjustment of the fastening element;

wherein the aperture of the socket is open at one lateral side via an inlet.

2. The mounting arrangement of claim 1, wherein abutment portions are arranged on the free ends of the legs.

3. The mounting arrangement of claim 1, wherein the number of legs of the anchoring element is two or more, such as three, four or five.

4. The mounting arrangement of claim 1, wherein the opening of the anchoring element has an interior thread.

5. The mounting arrangement of claim 1, wherein the fastening element comprises a stem extending from a head portion, the stem having an exterior thread.

6. The mounting arrangement of claim 1, wherein the stem has a recess reducing an effective diameter thereof.

7. The mounting arrangement of claim 6, wherein the recess is configured to reduce the effective diameter to be smaller than the width of the inlet leading to the aperture of the socket.

8. The mounting arrangement of claim 1, wherein the inlet has a width smaller than a diameter of the aperture.

9. The mounting arrangement of claim 1, wherein the inlet is provided with a one-way mechanism.

10. The mounting arrangement of claim 1, wherein the aperture is partly surrounded by an axially extending lip for positioning of the fastening element.

11. A method for mounting a mounting arrangement in an opening in a structure, the mounting arrangement comprising a socket, an anchoring element, and a fastening element, wherein the anchoring element has a U-shape shape with legs interconnected by a bridging portion wherein the socket comprises an aperture for receiving the fastening element, and wherein the aperture of the socket is open at one lateral side via an inlet, the method comprising:

attaching a distal end of the fastening element to the anchoring element;

arranging the anchoring element on a first side of the structure;

attaching the socket to a distal end of the fastening element on a second side of the structure, opposite to said first side, wherein the socket is attached to the distal end of the fastening element by inserting the fastening element via the inlet; and actuating the fastening element such as to reduce an axial distance between the anchoring element and the socket until portions of the anchoring element abut the first side of the structure and portions of the socket abut the second side of the structure while other portions of the socket are inserted in the opening, wherein the anchoring element maintains a constant profile before and after actuating the fastening element.

12. The method of claim 11, further comprising mounting a camera to the socket.

* * * * *